(12) United States Patent
Kuo et al.

(10) Patent No.: US 9,322,977 B2
(45) Date of Patent: Apr. 26, 2016

(54) DISPLAY APPARATUS

(71) Applicant: AU Optronics Corporation, Hsin-Chu (TW)

(72) Inventors: Chia-Wei Kuo, Hsin-Chu (TW);
Bo-Shiang Tzeng, Hsin-Chu (TW);
Yi-Yang Liao, Hsin-Chu (TW);
Kun-Ying Hsin, Hsin-Chu (TW);
Ching-Huan Lin, Hsin-Chu (TW);
Chin-Tang Chuang, Hsin-Chu (TW);
Yi-Hsiang Lai, Hsin-Chu (TW); Norio Sugiura, Hsin-Chu (TW)

(73) Assignee: AU OPTRONICS CORPORATION, Hsin-Chu (TW)

( * ) Notice: Subject to any disclaimer, the term of this patent is extended or adjusted under 35 U.S.C. 154(b) by 43 days.

(21) Appl. No.: 14/455,321

(22) Filed: Aug. 8, 2014

(65) Prior Publication Data
US 2015/0192727 A1 Jul. 9, 2015

(30) Foreign Application Priority Data
Jan. 6, 2014 (TW) .............................. 103100383 A

(51) Int. Cl.
*F21V 8/00* (2006.01)
(52) U.S. Cl.
CPC ............ *G02B 6/0036* (2013.01); *G02B 6/0061* (2013.01)
(58) Field of Classification Search
CPC ........................... G02B 6/0036; G02B 6/0068
USPC ..................................... 349/67, 65
See application file for complete search history.

(56) References Cited

U.S. PATENT DOCUMENTS

| 5,408,387 A | * | 4/1995 | Murase ............ B29D 11/00278 362/327 |
| 8,456,593 B2 | | 6/2013 | Park et al. |
| 2003/0137824 A1 | * | 7/2003 | Shinohara ............ G02B 6/0036 362/611 |
| 2007/0081111 A1 | * | 4/2007 | Chang .................. G02B 6/0055 349/62 |
| 2011/0141388 A1 | | 6/2011 | Park et al. |
| 2011/0149201 A1 | * | 6/2011 | Powell .............. G02F 1/133615 349/62 |
| 2011/0176089 A1 | * | 7/2011 | Ishikawa .............. G02B 6/0018 349/65 |
| 2011/0186114 A1 | * | 8/2011 | Homma .................. B32B 15/20 136/252 |
| 2011/0285922 A1 | * | 11/2011 | Ikuta .................... G02B 5/0226 348/739 |

(Continued)

FOREIGN PATENT DOCUMENTS

| JP | 06-130229 | * 5/1994 | ............... G02B 6/00 |
| JP | 6-130229 | 4/1995 | |

(Continued)

OTHER PUBLICATIONS

Taiwan Patent Office, "Office Action", Jan. 9, 2015.

*Primary Examiner* — Sang V Nguyen
(74) *Attorney, Agent, or Firm* — WPAT, P.C.; Justin King

(57) ABSTRACT

A display apparatus includes a display panel, a light guide plate, at least one light source and at least one reflective body. The light guide plate is disposed below the display panel. The light guide plate has a light-incident surface, a light-emitting surface, a rear surface, a plurality of concave microstructures and a plurality of reflective bodies. The rear surface is located farther away from the display panel than the light-emitting surface is. The light-incident surface is connected to the light-emitting surface and the rear surface. The concave microstructures are located on the rear surface. The reflective bodies are respectively located in the concave microstructures. The light source is disposed opposite to the light-incident surface.

29 Claims, 9 Drawing Sheets

(56) References Cited

U.S. PATENT DOCUMENTS

| | | | |
|---|---|---|---|
| 2013/0022759 A1* | 1/2013 | Okumura | H01J 37/3244 427/569 |
| 2013/0106922 A1 | 5/2013 | Chen et al. | |
| 2013/0155723 A1* | 6/2013 | Coleman | G02B 6/0018 362/621 |
| 2013/0215122 A1* | 8/2013 | McCollum | G02B 6/0018 345/501 |
| 2014/0085570 A1* | 3/2014 | Kuwata | G02B 6/0053 349/65 |

FOREIGN PATENT DOCUMENTS

| | | | | |
|---|---|---|---|---|
| TW | 200527059 | | 8/2005 | |
| TW | I283323 | | 7/2007 | |
| TW | 201300853 | | 1/2013 | |
| TW | 201317672 | | 5/2013 | |
| TW | 201328637 | * | 7/2013 | ............ A47F 3/00 |

* cited by examiner

US 9,322,977 B2

DISPLAY APPARATUS

RELATED APPLICATIONS

This application claims priority to Taiwan Application Serial Number 103100383, filed Jan. 6, 2014, which is herein incorporated by reference.

BACKGROUND

1. Technical Field

Embodiments of the present invention relate to a display apparatus. More particularly, embodiments of the present invention relate to a transparent display apparatus.

2. Description of Related Art

In pace with the advance of display technology, a transparent display apparatus is developed, which allows a viewer to see the scene or object behind the display panel.

A typical transparent display apparatus includes a liquid crystal panel and a backlight source. In the transparent display apparatus, the backlight source can be embodied by a lamp box. During operation, the light from the lamp box irradiates the liquid crystal panel, such that a user may see an image displayed on the liquid crystal panel. Further, the liquid crystal panel is light transmissive so as to allow a user to see the scene or object behind the liquid crystal panel. However, because the scene behind the liquid crystal panel is the interior of the lamp box, the user can only see the object inner the lamp box but cannot see the scene or object behind the lamp box.

If a typical edge-lit backlight module is used as the backlight source of the LCD, because the edge-lit backlight module has a reflective plate, it may block the user from viewing the scene behind the backlight module. However, if the reflective plate of the backlight module is omitted, the light outputting effect of the backlight module is reduced. As a result, the current transparent display apparatus has the foregoing difficulties needed to be overcome.

SUMMARY

One aspect of the present invention is to provide a transparent display apparatus having an edge-lit backlight module that provides enough light without a reflective plate.

In accordance with one embodiment of the present invention, a display apparatus include a display panel, a light guide plate and at least one light source. The light guide plate is disposed below the display panel. The light guide plate has a light-incident surface, a light-emitting surface, a rear surface, concave microstructures and reflective bodies. The rear surface is located farther away from the display panel than the light-emitting surface is. The light-incident surface is adjoined between the light-emitting surface and the rear surface. The concave microstructures are located on the rear surface. The reflective bodies are respectively located in the concave microstructures. The light source is disposed opposite to the light-incident surface.

In the foregoing embodiment, because the concave microstructures accommodating the reflective bodies are located on the rear surface, when the light source emits light toward the light guide plate, the concave microstructures and the reflective bodies therein can reflect the light, thereby promoting the light outputting effect.

It is to be understood that both the foregoing general description and the following detailed description are by examples, and are intended to provide further explanation of the invention as claimed.

BRIEF DESCRIPTION OF THE DRAWINGS

The invention can be more fully understood by reading the following detailed description of the embodiment, with reference made to the accompanying drawings as follows.

DETAILED DESCRIPTION

Figure 1:
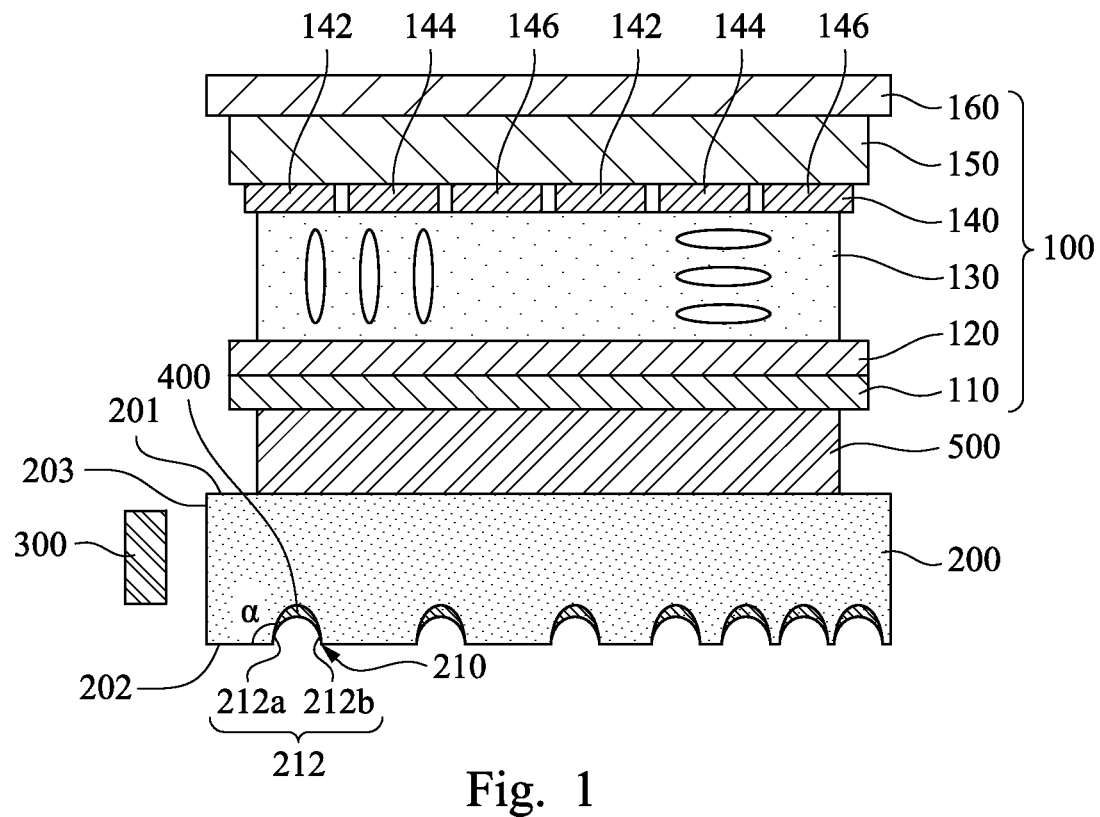
FIG. 1 is a cross-sectional view of a display apparatus in accordance with one embodiment of the present invention.

Reference will now be made in detail to the present embodiments of the invention, examples of which are illustrated in the accompanying drawings. Wherever possible, the same reference numbers are used in the drawings and the description to refer to the same or like parts.

FIG. 1 is a cross-sectional view of a display apparatus in accordance with one embodiment of the present invention. As shown in FIG. 1, the display apparatus includes a display panel 100, a light guide plate 200 and a light source 300. The light guide plate 200 is disposed below or behind the display panel 100. The light guide plate 200 has a light-emitting surface 201, a rear surface 202 and a light-incident surface 203. The light-incident surface 203 is adjoined between the light-emitting surface 201 and the rear surface 202. In some embodiments, the light-emitting surface 201, the light incident surface 203, the rear surface and another surface opposite to the light-incident surface 203 are adjoined sequentially to form a rectangular profile, so that the light guide plate 200 can be formed in a substantial cuboid configuration. The rear surface 202 is located farther away from the display panel 100 than the light-emitting surface 201 is. In other words, the light-emitting surface 201 faces toward the display panel 100, and the rear surface 202 faces away from the display panel 100. In some embodiments, the light-emitting surface 201 can be located between the display panel 100 and the rear surface 202.

The light source 300 is disposed opposite to the light-incident surface 202, but not below the display panel 100, so that the light source 300 and the light guide plate 200 can form an edge-lit backlight module. The light guide plate 200 has concave microstructures 210 located on the rear surface 202, and the light guide plate 200 has reflective bodies 400. The reflective bodies 400 are respectively located in the concave microstructures 210.

In the foregoing embodiment, the concave microstructures 210 are located on the rear surface 202 of the light guide plate 200, and the concave microstructures 210 further accommodate the reflective bodies 400. As a result, when the light source 300 emits light toward the light guide plate 200, the concave microstructures 210 and the reflective bodies 400 therein can reflect the light, so as to improve the light outputting effect of the light guide plate 200. In some embodiments, the material forming the reflective body 400 may include metal used for reflecting light, so as to improve the light outputting effect of the light guide plate 200. For example, the material forming the reflective body 400 may include, but is not limited to, aluminum (Al), argentum (Ag), aurum (Au).

In this embodiment, the display apparatus is a transparent or translucent display apparatus, and the light guide plate 200 is a transparent light guide plate. The rear surface 202 of the light guide plate 200 can be shown to the environment without being shaded by opaque material. For example, the rear surface 202 of the light guide plate 200 can be directly exposed to the environment or be covered by the transparent material. As such, the viewer not only can see the image displayed by the display panel 100, but also can see the scene or object below or behind the light guide plate 200, thereby implementing the transparent display effect.

Figure 2:
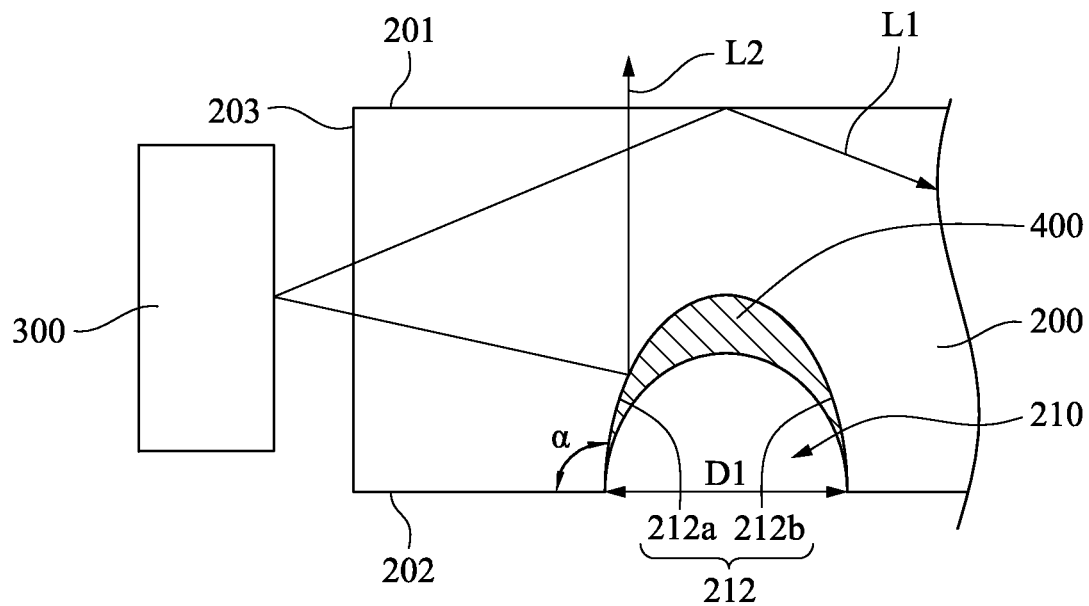
FIG. 2 is an optical path diagram of a light source and a light guide plate shown in FIG. 1.

FIG. 2 is an optical path diagram of the light source 300 and the light guide plate 200 shown in FIG. 1. In some embodiments, as shown in FIG. 2, light L1 emitted by the light source 300 travels in the light guide plate 200 in a total internal reflection manner. In particular, when the light L1 not hitting the concave microstructure 210 arrives at the light-emitting surface 201 or the rear surface 202, the total internal reflection occurs, so that the light L1 keeps traveling in the light guide plate 200. When light L2 emitted by the light source 300 arrives at the concave microstructure 210, the concave microstructure 210 reflects the light L2 along a direction substantially perpendicular to the light-emitting surface 201, so that the light L2 can be emitted out of the light-emitting surface 201 to the display panel 100 (see FIG. 1) above the light guide plate 200.

In some embodiments, the concave microstructure 210 has a surface 212. The surface 212 has a first portion surface 212a and a second portion surface 212b opposite to each other. The first portion surface 212a substantially faces toward the light source 300. The first portion surface 212a is oblique to the rear surface 202, so as to reflect the light L2 along the direction substantially perpendicular to the light-emitting surface 201. In particular, the first portion surface 212a and the rear surface 202 define an angle $\alpha$ therebetween, and the angle $\alpha$ is an obtuse angle. As a result, the first portion surface 212a can reflect the light L2 along the direction substantially perpendicular to the light-emitting surface 201. In some embodiments, the angle $\alpha$ satisfies the relationship: $125°<\alpha<145°$. The angle $\alpha$ satisfying the foregoing range enables the light L2 to be reflected by the first portion surface 212a to pass through the light-emitting surface 201, thus improving the light outputting effect of the light guide plate 200.

In some embodiments, the size of the concave microstructure 210 is in micron scales. For example, the concave microstructure 210 has a diameter D1 that satisfies the relationship: $0\ \mu m<D1<20\ \mu m$. When the light source 300 emits light, the concave microstructures 210 and the reflective bodies 400 received therein may not be easily seen by the viewer if the diameter D1 satisfies the foregoing range, so as to prevent the viewer from seeing dot-shaped patterns. Further, the diameter D1 satisfying the foregoing range can prevent the concave microstructure 210 from blocking the scene or object below or behind the rear surface 202.

In some embodiments, as shown in FIG. 2, the surface 212 may be a curved surface. In other words, the first portion surface 212a and the second portion surface 212b can be curved surfaces, but not flat surfaces. It is understood that, when the first portion surface 212a is a curved surface, the angle $\alpha$ can be the angle included between the tangent line of any point on the first portion surface 212a and the rear surface 202. In other words, when the angle included between the tangent line of any point on the first portion surface 212a and the rear surface 202 satisfies the relationship: $125°<\alpha<145°$, the first portion surface 212a can be enabled to reflect the light L2 along the direction substantially perpendicular to the light-emitting surface 201. In some embodiments, the concave microstructure 210 may be, but is not limited to, a semi-spherical recess, a semi-ellipsoidal recess or a semi-conical recess.

In some embodiments, as shown in FIG. 1, the concave microstructures 210 are arranged non-periodically. Comparing with a periodical arrangement, the non-periodical arrangement prevents the striped patterns (Moiré patterns) from appearing on the display panel 100, thus promoting the visual effect of the display apparatus.

Figure 3:
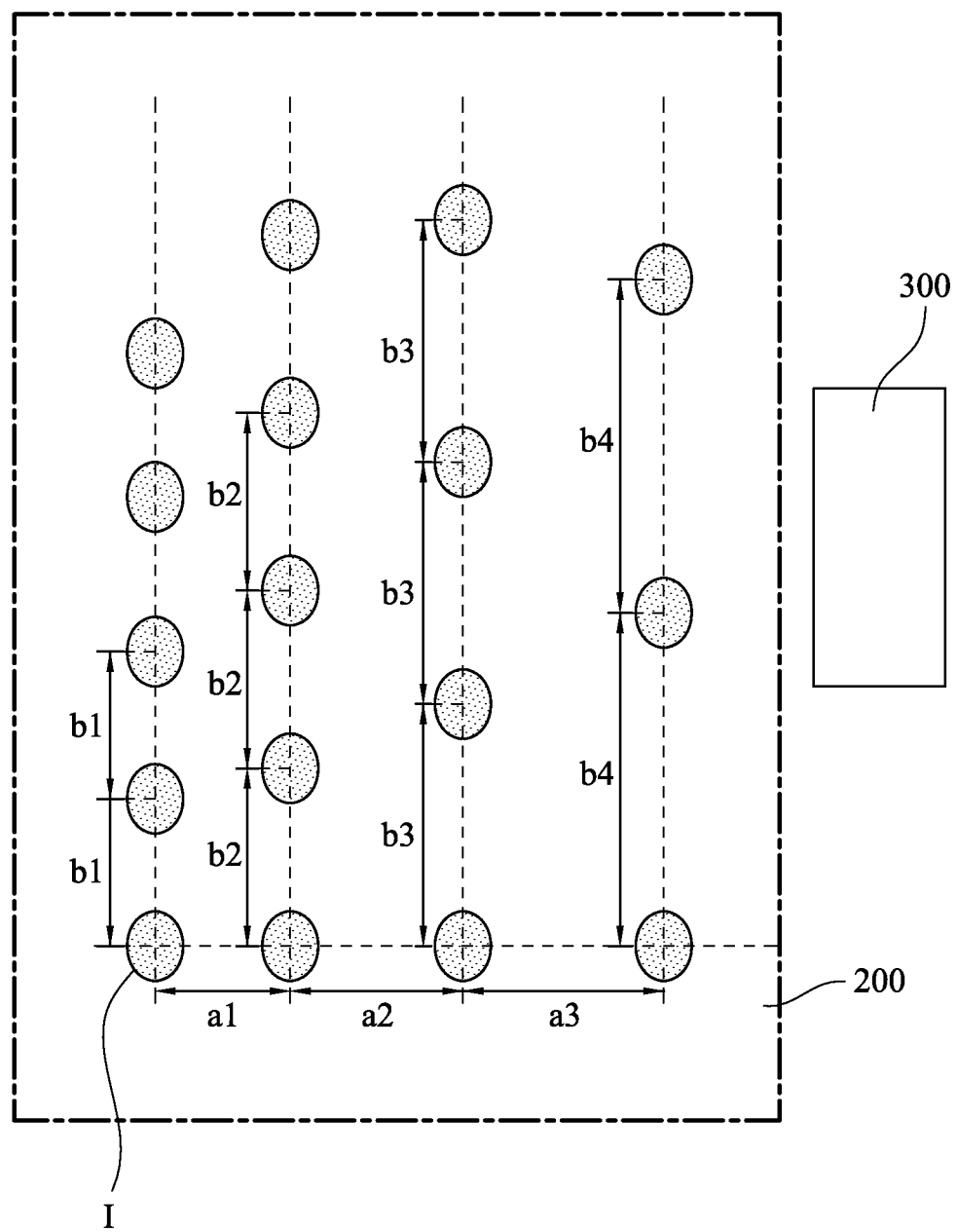
FIGS. 3 and 4 are schematic views showing the arrangement of concave microstructures in accordance with one embodiment of the present invention.
Figure 4:
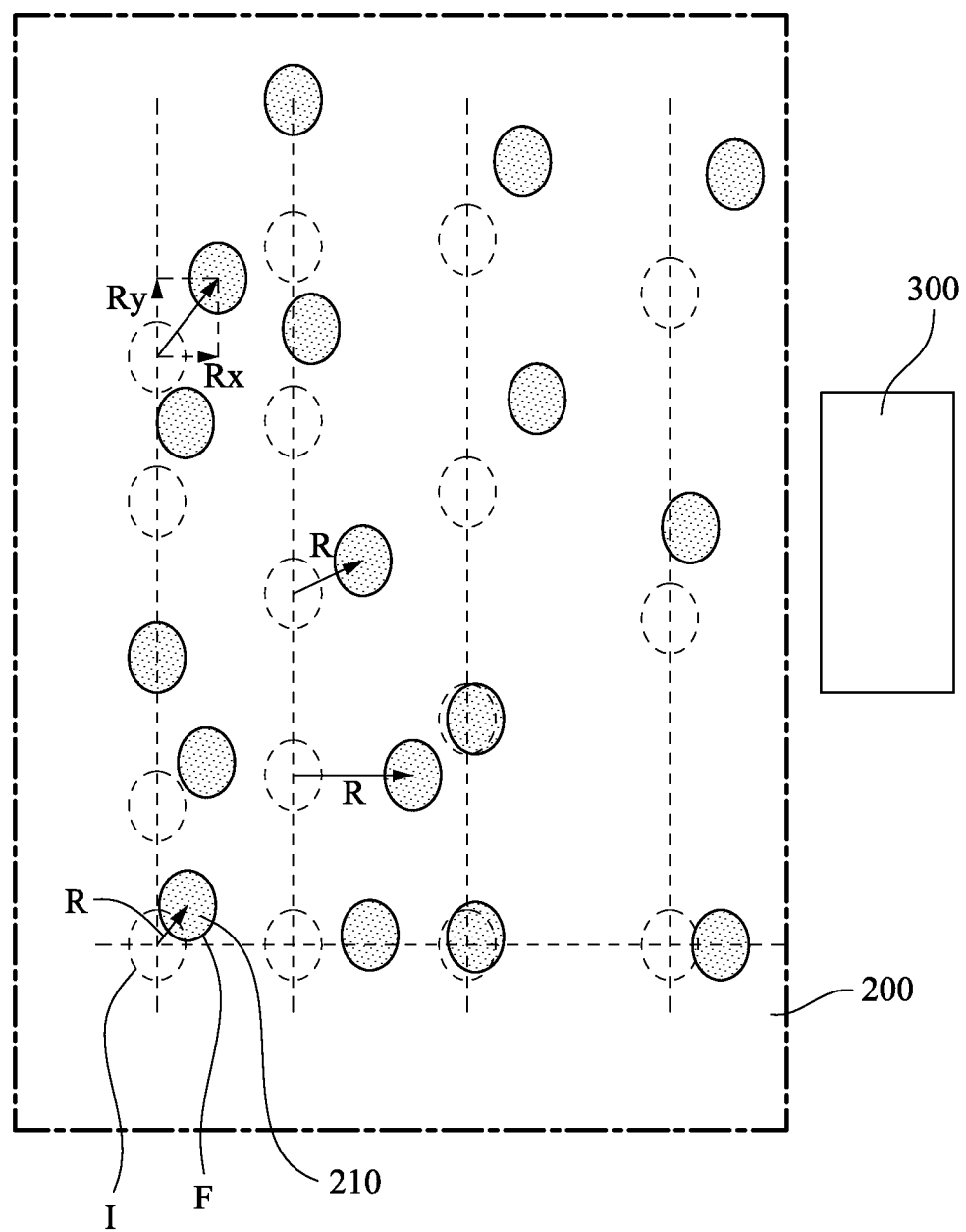

FIGS. 3 and 4 are schematic views showing the arrangement of the concave microstructures 210 in accordance with one embodiment of the present invention. As shown in FIG. 3, hypothetical positions I are selected from the light guide plate 200. These hypothetical positions I are arranged in a two-dimensional array. In other words, the hypothetical positions I are arranged in an array having plural columns and plural rows. Any two laterally adjacent hypothetical positions I define a transversal distance. The lateral distances are a1, a2, a3, . . . , and aj from left to right. Any two longitudinally adjacent hypothetical positions I define a longitudinal distance. The longitudinal distances are b1, b2, b3, . . . , and bj from left to right, where "j" is a positive integer. In some embodiments, the lateral distances a1, a2, a3, . . . , and aj are arranged along a direction toward the light source 300, and the longitudinal distances b1, b2, b3, . . . , and bj are arranged along the direction toward the light source 300 as well. In some embodiments, a1<a2<a3< . . . <aj, and b1<b2<b3<b4< . . . <bj.

As shown in FIG. 4, an actual position F on the light guide plate 200 can be selected corresponding to the hypothetical position I. The actual position F is spaced from the hypothetical position I at a shift value R, in which $R=\sqrt{(Rxj)^2+(Ryj)^2}$, and 0<Rxj<aj, 0<Ryj<bj. For example, the hypothetic position I on the first row and the first column can be shifted at the shift value R satisfying $R=\sqrt{(Rx1)^2+(Ry1)^2}$, in which 0<Rx1<a1, 0<Ry1<b1. The manufacturer may determine the actual position F based on the shift value R, and form the concave microstructure 210 at the actual position F.

By using the foregoing method, the concave microstructures 210 can be arranged non-periodically, so as to prevent the Moiré patterns from appearing on the display panel 100. Further, the greater the shift value R is (namely, the hypothetical position I is located farther away from the practical position F), the better the effect for alleviating the Moiré patterns is. As a result, the viewer not only sees the image displayed by the display panel 100 (see FIG. 1) more clearly, but also sees the scene or object below or behind the light guide plate 200 more clearly.

Figure 5:
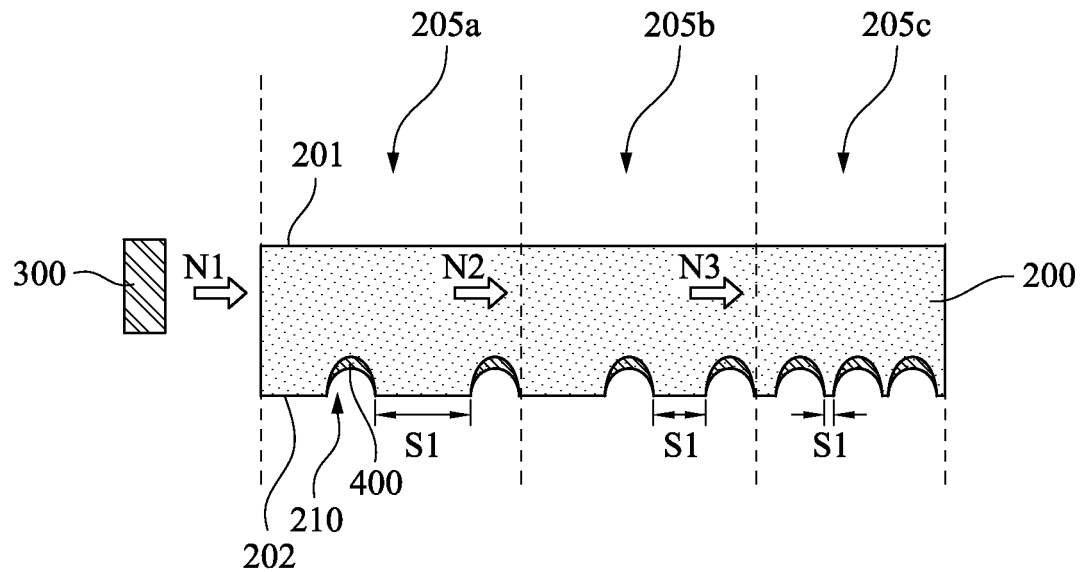
FIG. 5 is a cross-sectional view of the light source and the light guide plate in accordance with one embodiment of the present invention.

FIG. 5 is a cross-sectional view of the light source 300 and the light guide plate 200 in accordance with one embodiment of the present invention. As shown in FIG. 5, in some embodiments, any two adjacent concave microstructures 210 adjacent to each other define a gap S1. At least two of the gaps S1 are not equal. In other words, at least some concave microstructures 210 are arranged non-equidistantly, so as to prevent the Moiré patterns from appearing on the display panel 100. In some embodiments, all of the gaps S1 are not equal. In other words, all concave microstructures 210 are arranged non-equidistantly, so as to make the arrangement of the concave microstructures 210 more random, thereby further alleviating the Moiré patterns.

In some embodiments, as shown in FIG. 5, the gaps S1 are decreasing along a direction away from the light source 300. In other words, the concave microstructures 210 are arranged more closely away from the light source 300, and are arranged more sparsely toward the light source 300. That is, more concave microstructures 210 are located away from the light source 300, and fewer concave microstructures 210 are located close to the light source 300. As a result, even in the light guide plate 200, the light flux may be decreasing along the direction away from the light source 300, but the light guide plate 200 can still output light uniformly because more concave microstructures 210 are located away from the light source 300, thus improving the light reflection effect. Therefore, the arrangement of the concave microstructures 210 can prevent the zone of the light guide plate 200 closer to the light source 300 from being brighter than the zone of the light guide plate farther away from the light source 300.

In some embodiments, the gap S1 is decreasing along with the light incident amount to the zone in which the gap S1 is located. More particularly, as shown in FIG. 5, in some embodiments, the light guide plate 200 has light guide zones 205a, 205b and 205c. The light guide zones 205a, 205b and 205c are formed across the light-emitting surface 201 and the rear surface 202. The light guide zones 205a, 205b and 205c cover concave microstructures 210. In other words, at least two concave microstructures 210 are located in the light guide zone 205a, and at least two concave microstructures 210 are located in the light guide zone 205b, and at least two concave microstructures 210 are located in the light guide zone 205c. The light guide zones 205a, 205b and 205c are arranged along the direction away from the light source 300. In other words, the light guide zone 205a is closer to the light source 300 than the light guide zone 205b is, and the light guide zone 205b is closer to the light source 300 than the light guide zone 205c is.

When the light source 300 emits light, the light guide zone 205a receives the incident light amount N1, and the light guide zone 205b receives the incident light amount N2, and the light guide zone 205c receives the incident light amount N3. Because the concave microstructure 210 in the light guide zone 205a and the reflective body 400 therein reflects light and makes a portion of the light leave the light guide plate 200, the incident light amount N2 is less than the incident light amount N1. Similarly, because the concave microstructure 210 in the light guide zone 205b and the reflective body 400 therein reflects light and makes a portion of the light leave the light guide plate 200, the incident light amount N3 is less than the received light amount N2. As such, the received light amount N1 is greater than the incident light amount N2, and the incident light amount N2 is greater than the incident light amount N3.

In order to enable the light guide plate 200 to output light uniformly, in some embodiments, the incident light amounts N1, N2 and N3 are positively correlated to the gaps S1 in the light guide zones 205a, 205b and 205c. In other words, the gap S1 in the light guide zone 205a is greater than the gap S1 in the light guide zone 205b, and the gap S1 in the light guide zone 205b is greater than the gap S1 in the light guide zone 205c. As a result, the concave microstructures 210 in the light guide zone 205b can be arranged more closely than those in the light guide zone 205a, thereby providing higher reflection effect to the light guide zone 205b, and enabling the light guide zones 205b and 205a to output light uniformly. Similarly, the concave microstructures 210 in the light guide zone 205c can be arranged more closely than those in the light guide zone 205b, thereby providing higher reflection effect to the light guide zone 205c, and enabling the light guide zones 205c and 205c to output light uniformly. Therefore, the foregoing arrangement enables the light guide plate 200 to output light uniformly.

It is understood that the light guide zones shown in FIG. 5 are only used to explain the relationship between the received light amount and the gap, and the shapes and amounts of the light guide zones are not limited to those shown in FIG. 5. For example, the light guide plate 200 can be divided into 4, 5, 6 or more light guide zones.

In some embodiments, referring to FIG. 1, the display apparatus includes a low refractive index layer 500. The low refractive index layer 500 is located between the display panel 100 and the light-emitting surface 201 of the light guide plate 200. In some embodiments, a refractive index of a material of the low refractive index layer 500 is lower than a refractive index of a material of the light guide plate 200, so as to facilitate the light to travel in the light guide plate 200 in a total internal reflection manner. For example, the material forming the low refractive index layer 500 can be, but is not limited to, silicone, acrylic, glycerol or polyester. The material forming the light guide plate 200 can be, but is not limited to, glass.

In some embodiments, the low refractive index layer 500 can be an air layer, and the material forming the light guide plate 200 can be glass. Since the refractive index of air is 1, which is lower than the refractive index of the glass, the low refractive index layer 500 facilitates the light to travel in the light guide plate 200 in a total internal reflection manner.

In some embodiments, as shown in FIG. 1, the display panel 100 can be a LCD (liquid crystal display). For example, the display panel 100 includes polarizers 110 and 160, a TFT array substrate 120, a display liquid crystal layer 130, a color filter 140 and a substrate 150. The TFT array substrate 120 is disposed on the polarizer 110. The display liquid crystal layer 130 is disposed on the TFT array substrate 120. The display liquid crystal layer 130 includes liquid crystal cells that can be twisted due to the electric field on the TFT array substrate 120. The color filter 140 is disposed on the display liquid crystal layer 130. The color filter 140 can filter light in a particular wavelength range, so as to show colored images. The substrate 150 is disposed on the color filter 140, and the polarizer 160 is disposed on the substrate 150. The material forming the substrate 150 can be, but is not limited to, glass.

In some embodiments, as shown in FIG. 1, the display panel 100 includes sub-pixel zones 142, 144 and 146. The sub-pixel zones 142, 144 and 144 are zones with different colors on the color filter 140. For example, the sub-pixel zones 142, 144 and 146 may be red, green and blue respectively, so as to show colored images. In some embodiments, projections of the sub-pixel zones 142, 144 and 146 projected on the rear surface 202 of the light guide plate 200 respectively cover at least one concave microstructure 210. In other words, at least one concave microstructure 210 is located under the sub-pixel zone 142, and at least one concave microstructure 210 is located under the sub-pixel zone 144, and at least one concave microstructure 210 is located under the sub-pixel zone 146. In such a configuration, the sub-pixel zones 142, 144 and 146 can receive the light reflected by the concave microstructures 210 and the reflective bodies 400 therein, so as to show colored images.

Figure 6:
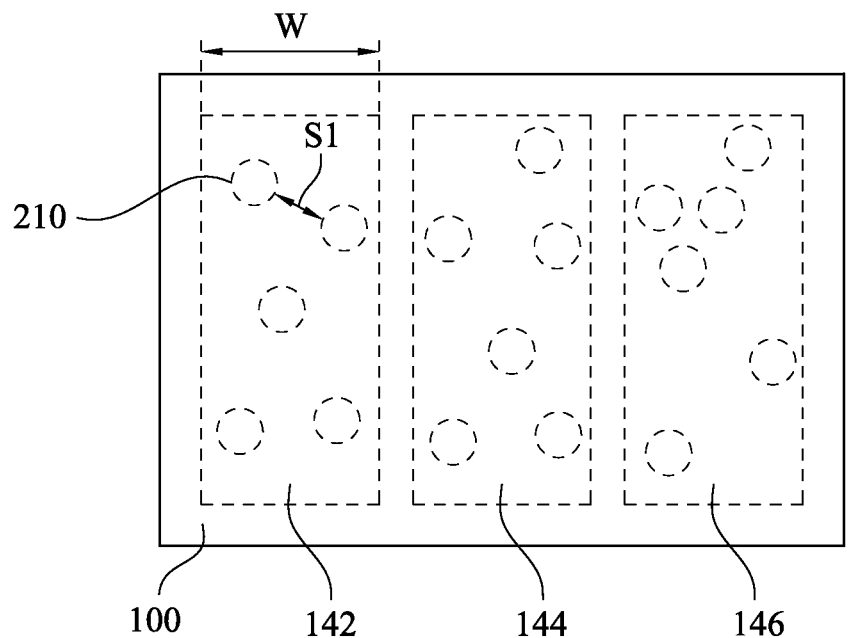
FIG. 6 is a local top view of the display apparatus in accordance with one embodiment of the present invention.

FIG. 6 is top view of the display apparatus in accordance with one embodiment of the present invention. As shown in FIG. 6, each of the sub-pixel zones 142, 144 and 146 has a width W. The gap S1 between two adjacent concave microstructures 210 is smaller than the width W. As a result, when the concave microstructures 210 are arranged non-periodically, there is still at least one concave microstructure 210 located under the sub-pixel zones 142, 144 or 146, so that the sub-pixel zones 142, 144 and 146 can receive the light reflected by the concave microstructures 210 and the reflective bodies 400 (See FIG. 5), so as to show colored images.

Figure 7:
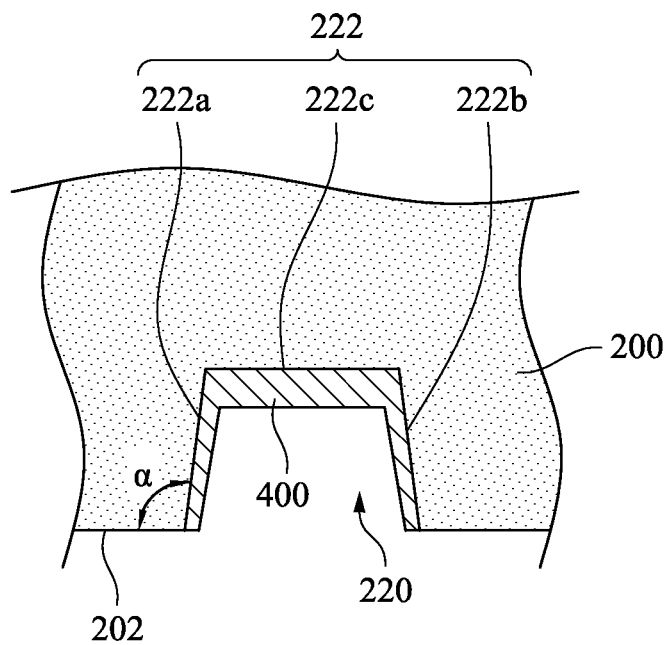
FIG. 7 is a local cross-sectional view of the light guide plate in accordance with one embodiment of the present invention.

FIG. 7 is a cross-sectional view of the light guide plate 200 in accordance with one embodiment of the present invention. As shown in FIG. 7, in this embodiment, the light guide plate 200 has a concave microstructure 220 of which the shape is different from the shape of the concave microstructure 210 (see FIG. 5). In particular, the surface 222 of the concave microstructure 220 includes a first portion surface 222a, a second portion surface 222b and a third portion surface 222c. The first portion surface 222a, the second portion surface 222b and the third portion surface 222c are all flat surfaces. The third portion surface 222c is adjoined between the first portion surface 222a and the second portion surface 222b. The first portion surface 222a substantially faces toward the light source 300 (see FIG. 5). The first portion surface 222a and the rear surface 202 define an angle α therebetween, and the angle α is an obtuse angle, so as to reflect the light emitted by the light source 300. In some embodiments, the angle α satisfies the relationship: $125°<α<145°$, so as to further improve the light outputting effect of the light guide plate 200. In some embodiments, the concave microstructure 220 can be, but is not limited to be, a trapezoidal recess. In some embodiments, the light guide plate 200 has concave microstructures 210 and 220. In some embodiments, the light guide plate 200 only has the concave microstructures 210 without the concave microstructures 220. On the other hand, in some embodiments, the light guide plate 200 only has the concave microstructures 220 without the concave microstructures 210.

Figure 8:
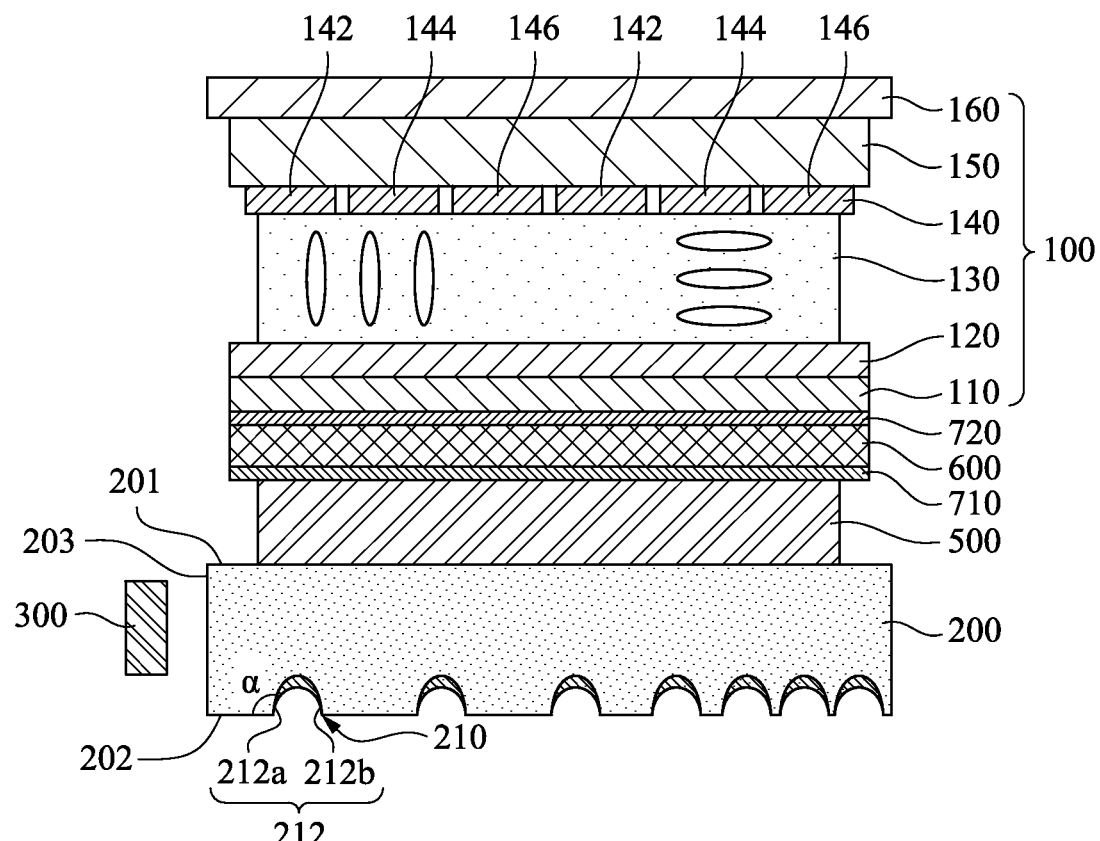
FIG. 8 is a cross-sectional view of the display apparatus in accordance with one embodiment of the present invention.

FIG. 8 is a cross-sectional view of the display apparatus in accordance with one embodiment of the present invention. The difference between this embodiment and that in FIG. 1 is that, the display apparatus of this embodiment includes a liquid crystal layer 600 and transparent electrodes 710 and 720. The liquid crystal layer 600 is located between the light guide plate 200 and the display panel 100, and is sandwiched between the transparent electrodes 710 and 720. The transparent electrodes 710 and 720 are used for controlling the liquid crystal layer 600 to switch between a transparent state and a translucent state. For example, when the light source 300 emits light and the display panel 100 shows images, the transparent electrodes 710 and 720 can control the liquid crystal layer 600 to be in the translucent state. In the translucent state, the liquid crystal layer 600 changes the direction of the light, so as to scatter the light, thereby preventing the viewer from seeing the dot-shaped patterns formed by the concave microstructures 210. On the other hand, when the light source 300 does not emit light and the display panel 100 does not show images, the transparent electrodes 710 and 720 can control the liquid crystal layer 600 to be in the transparent state, so as to facilitate the viewer to see the scene or object below or behind the light guide plate 200. In some embodiments, the material forming the liquid crystal layer 600 can be, but is not limited to, PDLC (polymer dispersed liquid crystal) or PNLC (polymer network liquid crystal). In some embodiments, the material forming the transparent electrodes 710 and 720 can be, but is not limited to, ITO (indium tin oxide) or IZO (indium zinc oxide).

In some embodiments, as shown in FIG. 8, the low refractive index layer 500 can be located between the transparent electrode 710 and the light-emitting surface 201 of the light guide plate 200, so as to facilitate the light to travel in the light guide plate 200 in a total internal reflection manner.

Figure 9A:
FIG. 9A to FIG. 9F are cross-sectional views of respective steps of a method for manufacturing the light guide plate in accordance with one embodiment of the present invention.

FIG. 9A to FIG. 9F are cross-sectional views of the light guide plate during the process manufacturing the same in accordance with one embodiment of the present invention. As shown in FIG. 9A, a transparent body 810 is provided. The material forming the transparent body 810 can be, but is not limited to, glass.

Figure 9B:
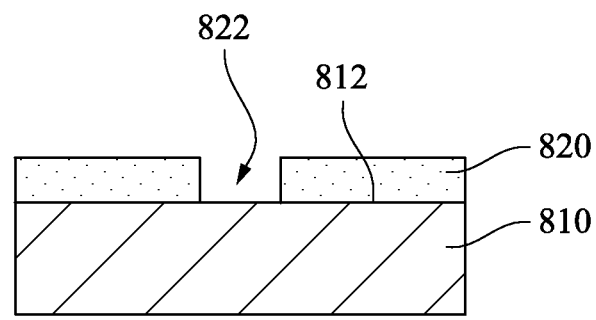

Then, as shown in FIG. 9B, the patterned mask 820 is formed on the surface 812 of the transparent body 810. Further, the patterned mask 820 has at least one through hole 822. A portion of the surface 812 of the transparent body 810 is exposed by the through hole 822. For example, the material of the patterned mask 820 may be, but is not limited to, photoresist, metal or a-Si (amorphous Silicon). When the material forming the patterned mask 820 is the photoresist, the through hole 822 can be formed by photolithography. When the material forming the patterned mask 820 is metal or a-Si, the through hole 822 can be formed by etching. The method for forming the through hole 822 is merely used for explanation, and does not intend to limit the present invention.

Figure 9C:
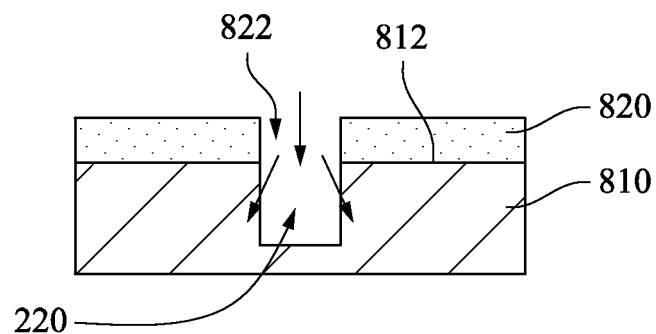
Figure 9D:
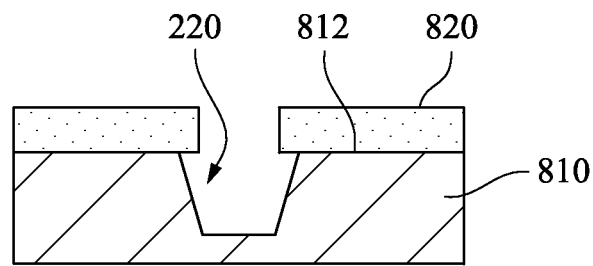

Then, as shown in FIGS. 9C and 9D, the concave microstructure 220 can be formed by etching. For example, the portion of the surface 812 exposed by the through hole 822 can be etched, so as to form the concave microstructure 220. For example, the portion of the surface 812 exposed by the through hole 822 can be etched by wet etching, so as to form a trapezoidal concave microstructure 220. After etching, the patterned mask 820 can be removed. In this embodiment, the trapezoidal concave microstructure 220 is formed, but in other embodiments, the concave microstructure 210 (see FIG. 8) in different shape can be formed as well.

Figure 9E:
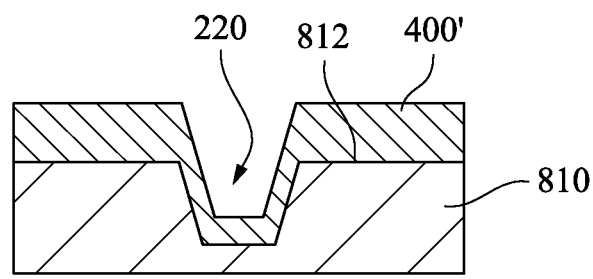

Then, as shown in FIG. 9E, the reflective material 400' can be formed to cover the surface 812 of the transparent body 810 and the concave microstructure 220. For example, the reflective material 400' can be formed on the surface 812 of the transparent body 810 and in the concave microstructure 220 by sputtering, evaporating, CVD (chemical vapor deposition) or PVD (physical vapor deposition).

Figure 9F:
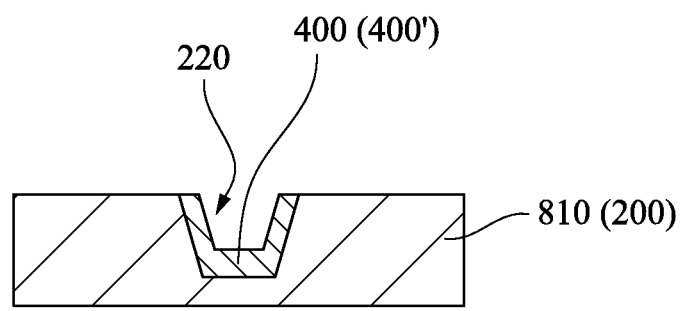

Thereafter, as shown in FIG. 9F, a portion of the reflective material 400' located outside the concave microstructure 200 can be removed, and another portion of the reflective material 400' can be left in the concave microstructure 220, so as to form the reflective body 400. In this figure, the transparent body 810 has the concave microstructures 220 accommodating the reflective bodies 400, so as to be used as the foregoing light guide plate 200.

Figure 10:
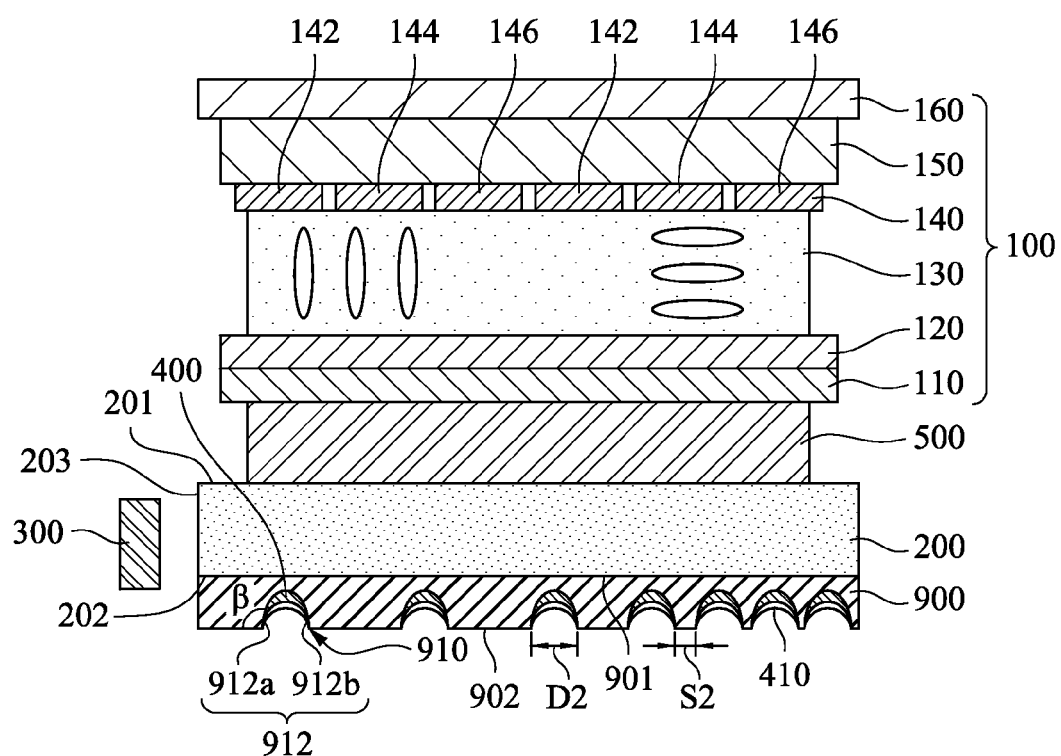
FIG. 10 is a cross-sectional view of the display apparatus in accordance with one embodiment of the present invention.

FIG. 10 is a cross-sectional view of a display apparatus in accordance with one embodiment of the present invention. The difference between this embodiment and that in FIG. 1 is that, the light guide plate 200 of this embodiment further includes a light transmissive film 900. The light transmissive film 900 is disposed on the rear surface 202 of the light guide plate 200. The light transmissive film 900 has an inner surface 901, an outer surface 902 and concave microstructures 910. The inner surface 901 is in contact with the rear surface 202 of the light guide plate 200. The outer surface 902 is opposite to the rear surface 202. The concave microstructures 910 are disposed on the outer surface 902. As a result, the light guide plate 200 does not need concave microstructures to be formed thereon. In some embodiments, concave microstructures 910 can be formed on the light transmissive film 900 by stamping, so that the photolithography and etching process to the light guide plate 200 can be omitted, thus reducing fabrication cost.

In some embodiments, the concave microstructure 910 has a surface 912. The surface 912 has a first portion surface 912a and a second portion surface 912b opposite to each other. The first portion surface 912a substantially faces toward the light source 300. The first portion surface 912a and the outer surface 902 define an angle β therebetween, and the angle β is an obtuse angle, so that the first portion surface 912a can reflect the light along the direction substantially perpendicular to the inner surface 901, thus allowing the light to pass through the rear surface 202 and the light-emitting surface 201 of the light guide plate 200. In some embodiments, the angle β satisfies the relationship: 125°<β<145°. The angle β satisfying the foregoing range facilitates the light reflected by the first portion surface 912a to go through the inner surface 901 and the rear surface 202 and the light-emitting surface 201 of the light guide plate 200, so as to improve the light outputting ability of the light guide plate 200.

In some embodiments, as shown in FIG. 10, the size of the concave microstructure 910 is in micron scales. For example, the concave microstructure 910 has a diameter D2 that satisfies the relationship: 0 μm<D2<20 μm. When the light source 300 emits light, the concave microstructures 910 and the reflective bodies 400 therein may not be easily seen by the viewer if the diameter D2 satisfies the foregoing range, so as to prevent the viewer from seeing dot-shaped patterns. Further, the diameter D2 satisfying the foregoing range can prevent the concave microstructure 910 from blocking the scene or object below or behind the light transmissive film 900.

In some embodiments, the concave microstructure 910 may be, but is not limited to, a semi-spherical recess, a semi-ellipsoidal recess or a semi-conical recess.

In some embodiments, as shown in FIG. 10, the display apparatus further includes at least one antioxidant layer 410. The antioxidant layer 410 is located in the concave microstructure 910 and covers the reflective body 400. In such a configuration, when the material forming the reflective body 400 includes metal, the antioxidant layer 410 can prevent the metal from oxidation. In some embodiments, the antioxidant layer 410 can also be located in the concave microstructure 210 (See FIG. 1) of the light guide plate 200 and cover the reflective body 400.

In some embodiments, as shown in FIG. 10, the concave microstructures 910 are arranged non-periodically. Comparing with a periodical arrangement, the non-periodical arrangement can prevent the striped patterns (Moiré patterns), thus promoting the visual effect of the display apparatus. More particularly, in some embodiments, any two of the concave microstructures 910 adjacent to each other define a gap S2. At least two of the gaps S2 are not equal. In other words, at least some concave microstructures 910 are arranged non-equidistantly. In some embodiments, all of the concave microstructures 910 are arranged non-equidistantly, so as to make the arrangement of the concave microstructures 910 more random, thereby further alleviating the Moiré patterns.

In some embodiments, as shown in FIG. 10, the gaps S2 are decreasing along a direction away from the light source 300. In other words, the concave microstructures 210 are arranged more closely away from the light source 300, and are arranged more sparsely toward the light source 300, so as to facilitate the light guide plate 200 to output lights uniformly. As a result, even in the light guide plate 200, the light flux may be decreasing along the direction away from the light source 300, but the light guide plate 200 can still output lights uniformly because more concave microstructures 910 are located away from the light source 300, which improves the light reflection ability. Therefore, the arrangement of the concave microstructures 910 can prevent the zone of the light guide plate 200 closer to the light source 300 from being brighter than the zone of the light guide plate 200 farther away from the light source 300.

In some embodiments, as shown in FIG. 10, the display panel 100 includes sub-pixel zones 142, 144 and 146. Projections of the sub-pixel zones 142, 144 and 146 projected on the outer surface 902 of the light transmissive film 900 respectively cover at least one concave microstructure 910. In other words, at least one concave microstructure 910 is located under the sub-pixel zone 142, and at least one concave microstructure 910 is located under the sub-pixel zone 144, and at least one concave microstructure 910 is located under the sub-pixel zone 146. In such a configuration, the sub-pixel zones 142, 144 and 146 can receive the light reflected by the concave microstructures 910 and the reflective bodies 400 therein, so as to show colored images.

Figure 11:
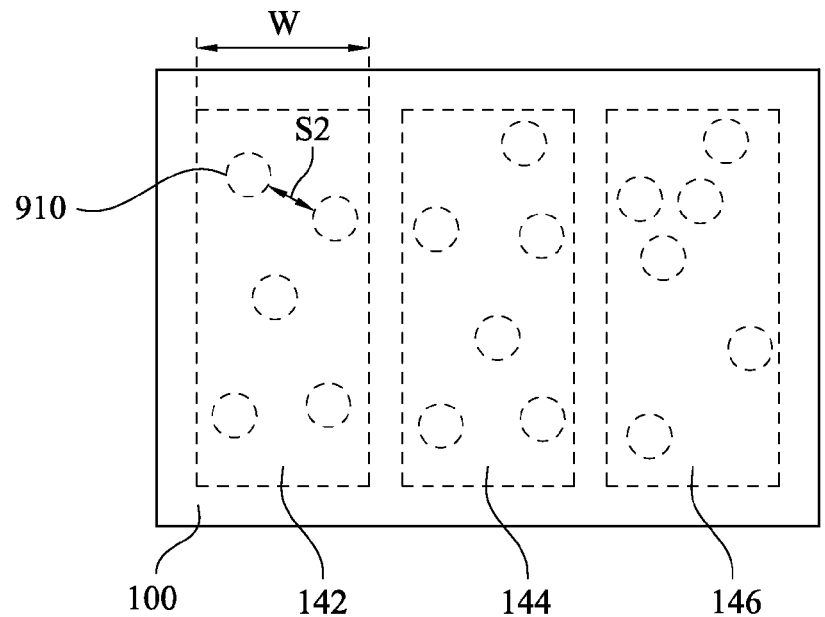
FIG. 11 is a local top view of the display apparatus in accordance with one embodiment of the present invention.

FIG. 11 is top view of the display apparatus in accordance with one embodiment of the present invention. As shown in FIG. 11, each of the sub-pixel zones 142, 144 and 146 has a width W. The gap S2 between two adjacent concave microstructures 910 is less than the width W. As a result, when the concave microstructures 910 are arranged non-periodically, there is still at least one concave microstructure 910 located under the sub-pixel zones 142, 144 or 146, so that the sub-pixel zones 142, 144 and 146 can receive the light reflected by the concave microstructures 910 and the reflective bodies 400 (See FIG. 10), so as to show colored images.

In some embodiments, as shown in FIG. 10, the low refractive index layer 500 is located between the display panel 100 and the light-emitting surface 201 of the light guide plate 200. In some embodiments, a refractive index of a material of the low refractive index layer 500 is lower than a refractive index of a material of the light guide plate 200, so as to facilitate the light to travel in the light guide plate 200 in a total inner reflection manner. For example, the material forming the low refractive index layer 500 can be, but is not limited to, silicone, acrylic, glycerol or polyester. The material forming the light guide plate 200 can be, but is not limited to, glass.

In some embodiments, the low refractive index layer 500 can be an air layer, and the material forming the light guide plate 200 can be glass. Since the refractive index of air is 1, which is lower than the refractive index of the glass, the low refractive index layer 500 facilitates the light to travel in the light guide plate 200 in a total inner reflection manner.

Figure 12:
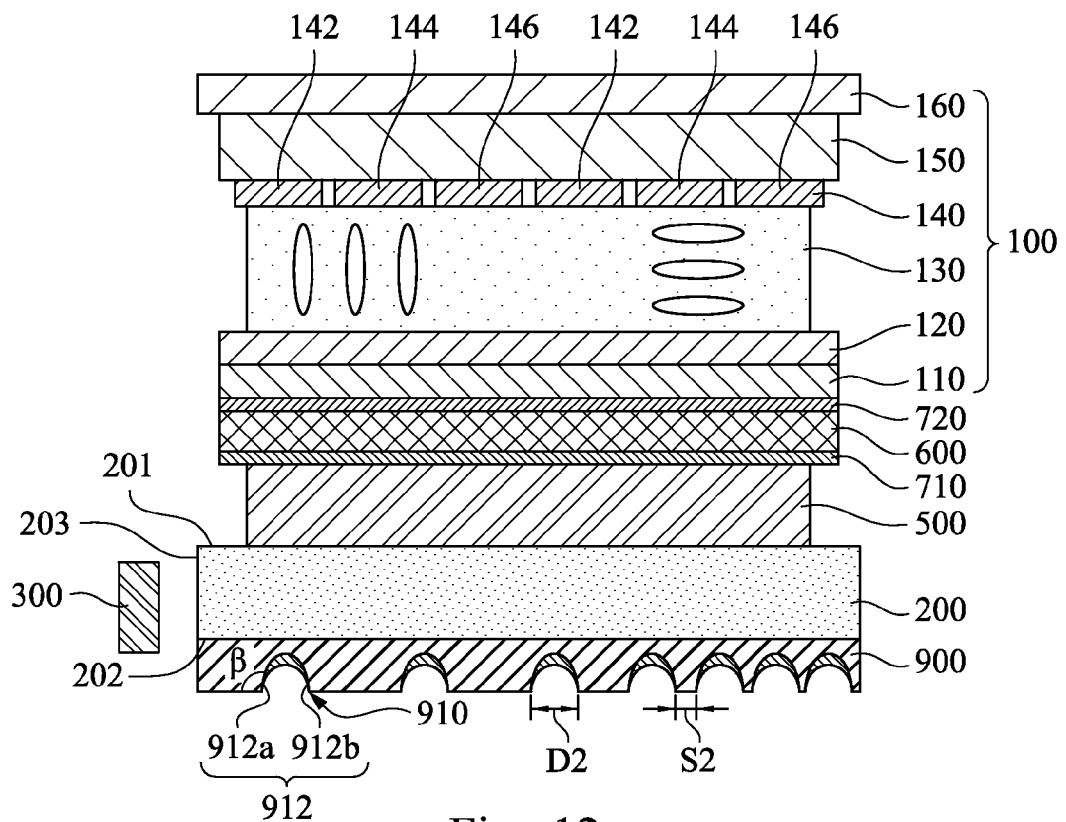
FIG. 12 is a local cross-sectional view of the display apparatus in accordance with one embodiment of the present invention.

FIG. 12 is a cross-sectional view of the display apparatus in accordance with one embodiment of the present invention. The difference between this embodiment and which in FIG. 10 is that: the display apparatus includes a liquid crystal layer 600 and transparent electrodes 710 and 720. The liquid crystal layer 600 is located between the light guide plate 200 and the display panel 100, and sandwiched between the transparent electrodes 710 and 720. The transparent electrodes 710 and 720 are used for controlling the liquid crystal layer 600 to switch between a transparent state and a translucent state. For example, when the light source 300 emits light and the display panel 100 shows images, the transparent electrodes 710 and 720 can control the liquid crystal layer 600 to be in the translucent state. In the translucent state, the liquid crystal layer 600 changes the direction of the light, so as to scatter the light, thereby preventing the viewer from seeing the dot-shaped patterns formed by the concave microstructures 910. On the other hand, when the light source 300 does not emit light and the display panel 100 does not show images, the transparent electrodes 710 and 720 can control the liquid crystal layer 600 to be in the transparent state, so as to facilitate the viewer to see the scene or object below or behind the light transmissive film 900. In some embodiments, the material forming the liquid crystal layer 600 can be, but is not limited to, PDLC (polymer dispersed liquid crystal) or PNLC (polymer network liquid crystal). In some embodiments, the material forming the transparent electrodes 710 and 720 can be, but is not limited to, ITO (indium tin oxide) or IZO (indium zinc oxide).

In some embodiments, as shown in FIG. 12, the low refractive layer 500 can be located between the transparent electrode 710 and the light-emitting surface 201 of the light guide plate 200, so as to facilitate the light to travel in the light guide plate 200 in a total inner reflection manner.

Although the present invention has been described in considerable detail with reference to certain embodiments thereof, other embodiments are possible. Therefore, the spirit and scope of the appended claims should not be limited to the description of the embodiments contained herein.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims.

What is claimed is:

1. A display apparatus, comprising:
   a display panel;
   a light guide plate disposed below the display panel, the light guide plate having a light-incident surface, a light-emitting surface, a rear surface, a plurality of concave microstructures and a plurality of reflective bodies, wherein the rear surface is located farther away from the display panel than the light-emitting surface is, and the light-incident surface is adjoined between the light-emitting surface and the rear surface, and the concave microstructures are recessed into the rear surface for forming a pattern of concave grooves on the rear surface, and the reflective bodies are respectively accommodated in the concave microstructures, wherein the rear surface is not flat; and
   at least one light source disposed opposite to the light-incident surface.

2. The display apparatus of claim 1, wherein each of the concave microstructures has a surface, and a portion of the surface substantially faces toward the light source, and an angle α is defined between the portion of the surface and the rear surface, and the angle α is an obtuse angle.

3. The display apparatus of claim 2, wherein the angle α satisfies the relationship: 125°<α<145°.

4. The display apparatus of claim 1, wherein material forming each of the reflective bodies comprises metal.

5. The display apparatus of claim 1, wherein each of the concave microstructures has a diameter D1 that satisfies the relationship: 0 μm<D1<20 μm.

6. The display apparatus of claim 1, wherein the concave microstructures are arranged non-periodically.

7. The display apparatus of claim 1, wherein any two adjacent concave microstructures define a gap, wherein at least two of the gaps are not equal.

8. The display apparatus of claim 7, wherein the gaps are decreasing along a direction moving away from the light source.

9. The display apparatus of claim 7, wherein the light guide plate has a plurality of light guide zones, and an incident light amount to the light guide zones is positively correlated to the gaps between every two adjacent concave microstructures in the light guide zones.

10. The display apparatus of claim 1, wherein the display panel comprises a plurality of sub-pixel zones, and a projection of each of the sub-pixel zones on the rear surface of the light guide plate covers at least one of the concave microstructures.

11. The display apparatus of claim 1, further comprising:
   a low refractive index layer located between the display panel and the light-emitting surface, wherein a refractive index of a material forming the low refractive index layer is lower than a refractive index of a material forming the light guide plate.

12. The display apparatus of claim 11, wherein the material forming the light guide plate is glass, and the low refractive index layer is an air layer.

13. The display apparatus of claim 1, further comprising:
   a liquid crystal layer located between the light guide plate and the display panel; and
   at least one transparent electrode for controlling the liquid crystal layer to switch between a transparent state and a translucent state.

14. The display apparatus of claim 1, further comprising:
   at least one antioxidant layer which is located in at least one of the concave microstructures and covers at least one of the reflective bodies.

15. The display apparatus of claim 11, wherein the material forming the light guide plate is glass, and the material forming the low refractive index layer is silicone, acrylic, glycerol or polyester.

16. The display apparatus of claim 1, wherein the light guide plate further comprises a light transmissive film disposed on the rear surface, and the concave microstructures are disposed on an outer surface of the light transmissive film.

17. The display apparatus of claim 16, wherein each of the concave microstructures has a surface, and a portion of the surface substantially faces toward the light source, and an angle β is defined between the portion of the surface and the outer surface of the light transmissive film, and the angle β is an obtuse angle.

18. The display apparatus of claim 17, wherein the angle β satisfies the relationship: 125°<β<145°.

19. The display apparatus of claim 16, wherein material forming each of the reflective bodies comprises metal.

20. The display apparatus of claim 16, wherein each of the concave microstructures has a diameter D2 that satisfies the relationship: 0 μm<D2<20 μm.

21. The display apparatus of claim 16, wherein the concave microstructures are arranged non-periodically.

22. The display apparatus of claim 16, wherein any two adjacent concave microstructures define a gap, and at least two of the gaps are not equal.

23. The display apparatus of claim 22, wherein the gaps are decreasing reduce along a direction moving away from the light source.

24. The display apparatus of claim 16, wherein the display panel comprises a plurality of sub-pixel zones, and a projection of each of the sub-pixel zones on the outer surface of the light transmissive film covers at least one of the concave microstructures.

25. The display apparatus of claim 16, further comprising:
   a low refractive index layer located between the display panel and the light emitting surface, wherein a refractive index of a material forming the low refractive index layer is lower than a refractive index of a material forming the light guide plate.

26. The display apparatus of claim 25, wherein the material forming the light guide plate is glass, and the low refractive index layer is an air layer.

27. The display apparatus of claim 25, wherein the material forming the light guide plate is glass, and the material forming the low refractive index layer is silicone, acrylic, glycerol or polyester.

28. The display apparatus of claim 16, further comprising:
a liquid crystal layer located between the light guide plate and the display panel; and
at least one transparent electrode for controlling the liquid crystal layer to switch between a transparent state and a translucent state.

29. The display apparatus of claim 16, further comprising:
at least one antioxidant layer which is located in at least one of the concave microstructures and covers at least one of the reflective bodies.

* * * * *